(12) United States Patent
Wheaton et al.

(10) Patent No.: US 7,992,826 B2
(45) Date of Patent: Aug. 9, 2011

(54) LEADING EDGE FLAP METHOD

(75) Inventors: James M. Wheaton, Collierville, TN (US); Stephen R. Amorosi, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/897,646

(22) Filed: Oct. 4, 2010

(65) Prior Publication Data

US 2011/0024575 A1 Feb. 3, 2011

Related U.S. Application Data

(60) Continuation of application No. 11/778,995, filed on Jul. 17, 2007, now Pat. No. 7,828,250, which is a division of application No. 10/955,686, filed on Sep. 30, 2004, now Pat. No. 7,264,206.

(51) Int. Cl.
*B64C 3/50* (2006.01)

(52) U.S. Cl. .......... 244/214; 244/213; 244/210
(58) Field of Classification Search .......... 244/214, 244/213, 210, 49, 198
See application file for complete search history.

(56) References Cited

U.S. PATENT DOCUMENTS 6,364,254 B1 * 4/2002 May ................ 244/214
7,828,250 B2 * 11/2010 Wheaton et al. .......... 244/214

* cited by examiner

*Primary Examiner* — J. Woodrow Eldred

(57) ABSTRACT

A method of reducing drag of a leading edge device having first and second flow surfaces includes coupling the first flow surface to an airfoil and coupling the second flow surface to the first flow surface. The leading edge device may be moved between a retracted position and an extended position. The second flow surface may be positioned generally behind the first flow surface during at least a portion of the movement of the leading edge device between the retracted and extended positions.

17 Claims, 6 Drawing Sheets

LEADING EDGE FLAP METHOD

CROSS-REFERENCE TO RELATED APPLICATIONS

This application is a continuation of and claims priority to U.S. application Ser. No. 11/778,995 filed on Jul. 17, 2007 and entitled LEADING EDGE FLAP APPARATUSES AND ASSOCIATED METHODS which is a divisional of and claims priority to U.S. application Ser. No. 10/955,686 filed on Sep. 30, 2004, now U.S. Pat. No. 7,264,206 issued on Sep. 4, 2007 and entitled LEADING EDGE FLAP APPARATUSES AND ASSOCIATED METHODS, the entire contents of each application being expressly incorporated herein by reference.

FIELD

Embodiments of the present disclosure relate to leading edge flap apparatuses and corresponding methods.

BACKGROUND

Modern aircraft often use a variety of high lift leading edge and trailing edge devices to improve high angle of attack performance during various phases of flight, for example, takeoff and landing. One such device is a leading edge Krueger assembly 10, shown schematically in an extended position in FIG. 1. When the Krueger assembly 10 is in the extended position, it can improve the airflow characteristics over a wing 40 at high angles of attack, allowing the wing 40 to operate at higher angles of attack without stalling.

The Krueger assembly 10 includes a first surface 11, a second surface 12, six links that connect the Krueger assembly 10 to the wing 40, and an actuator 30. The actuator 30 includes a torque tube 31 with a lever 32. The lever 32 is pivotally connected to a first link 14 at point Q. The first link 14 is also pivotally connected to a second link 16 at point S. The second link 16 is pivotally connected to the wing 40 at point R and pivotally connected to a third link 18 at point T. The third link 18 is pivotally connected to the first surface 11 at point U.

The first surface 11 is pivotally connected to the wing 40 at point O. As the actuator 30 rotates the torque tube 31, the lever 32 moves the first link 14, which in turn moves the second link 16 and the third link 18. The third link 18 causes the first surface 11 to pivot about point O.

The second surface 12 is pivotally connected to the first surface 11 at point P. Three additional links coordinate the movement of the second surface 12 relative to the first surface 11. In particular, a fourth link 20 is pivotally connected to the wing 40 at point V and pivotally connected to a fifth link 22 at point W. The fifth link 22 is pivotally connected to the first surface 11 at point X and pivotally connected to a sixth link 24 at point Y. The sixth link 24 is pivotally connected to the second surface 12 at point Z. As the actuator 30 moves the first surface 11, the second surface 12 is moved in a coordinated manner relative to the first surface 11 by the fourth link 20, the fifth link 22, and the sixth link 24.

The Krueger assembly 10 can be retracted to form a lower portion of the wing 40. In FIG. 1, the first and second surfaces 11, 12 are shown in the retracted position by dotted lines. The retracted position is suitable for cruise and other low angle of attack operations. In order to move the Krueger assembly 10 from the retracted to the extended position, the actuator 30 rotates the torque tube 31 in the direction of the arrow $R_1$.

During extension, the second surface 12 rotates relative to the first surface 11 about point P as both surfaces move to the extended position. As the two surfaces transition through an intermediate position where the first surface 11 is approximately perpendicular to a chord line 42 of the wing 40, the second surface 12 rotates relative to the first surface 11 so that it extends below the first surface 11, as shown by dashed lines in FIG. 1. This arrangement presents a large surface area to the relative wind (arrow W) during extension. Accordingly, the drag created by the first and second surfaces 11, 12 as the Krueger assembly 10 transitions through this intermediate position can be greater than the drag of the first and second surfaces 11, 12 in the extended or retracted positions.

Although the Krueger assembly 10 only has one extended position, the actuator 30 can also be connected to other devices (not shown) that have multiple extended positions. Accordingly, once the Krueger assembly 10 is moved from the retracted position to the extended position, the actuator 30 can rotate an additional amount in the direction of arrow $R_1$ to move the other devices to additional extended positions. As the actuator 30 rotates by this additional amount, the torque tube 31 moves the lever 32, which moves the first link 14 as shown by ghosted lines, but leaves the first and second surfaces 11, 12 in generally the same extended position. A drawback with the system discussed above and shown in FIG. 1 is that it is complex (using six links with ten pivot points) and therefore costly to manufacture and maintain.

SUMMARY

The above-described needs associated with transparent composite articles are specifically addressed and alleviated by the present disclosure which, in an embodiment, provides a method of reducing drag of a leading edge device. The leading edge device may have first and second flow surfaces. The method may comprise the steps of coupling the first flow surface to an airfoil, coupling the second flow surface to the first flow surface, moving the leading edge device between a retracted position and an extended position, and positioning the second flow surface generally behind the first flow surface during at least a portion of the movement of the leading edge device between the retracted and extended positions.

In a further embodiment, disclosed is a method of reducing drag of a leading edge device of a wing during movement of the leading edge device between retracted and extended positions along a motion path. The method may comprise coupling an upper portion of a first flow surface to a leading edge of the wing and coupling an upper portion of a second flow surface to a lower portion of the first flow surface. The method may further include moving the leading edge device along a first segment of the motion path between the retracted position and an intermediate position. In addition, the method may include positioning the second flow surface generally behind the first flow surface when moving the moving the leading edge device along the first segment.

Also disclosed is a further embodiment of a method of reducing drag of a leading edge device of an aircraft wing during movement of the leading edge device between retracted and extended positions along a motion path. The method may comprise the coupling an upper portion of a first flow surface to the leading edge of the wing and coupling an upper portion of a second flow surface to a lower portion of the first flow surface. The method may further include moving the leading edge device along a first segment of the motion path between the retracted position and an intermediate position. The second flow surface may be positioned generally behind the first flow surface with respect to relative wind when moving the moving the leading edge device along the first segment. The first flow surface may be oriented approximately perpendicular to a chord line of the wing when the leading edge device is in the intermediate position. The method may further include moving the leading edge device along a second segment of the motion path between the intermediate position and the retracted position. In addition, the second flow surface may be positioned below the first flow surface when moving the leading edge device along the second segment.

The features, functions and advantages that have been discussed can be achieved independently in various embodiments of the present disclosure or may be combined in yet other embodiments, further details of which can be seen with reference to the following description and drawings below.

DETAILED DESCRIPTION

The present disclosure describes leading edge flap apparatuses and associated methods. Several specific details of the disclosure are set forth in the following description and in FIGS. 2-7 to provide a thorough understanding of certain embodiments of the disclosure. One skilled in the art, however, will understand that the present disclosure may have additional embodiments, and that other embodiments of the disclosure may be practiced without several of the specific features described below.

Figure 2:
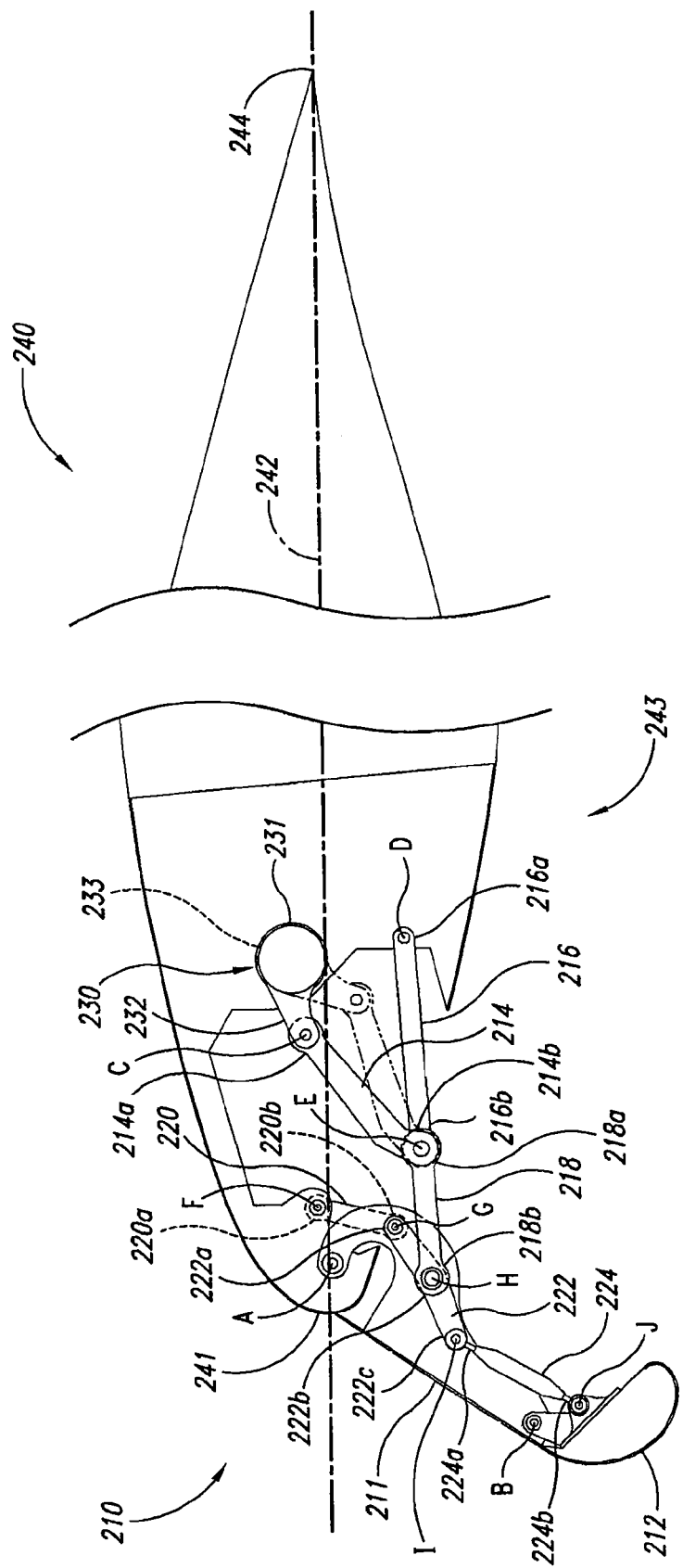
FIG. 2 is a partial schematic illustration of an airfoil and a leading edge device shown in an extended position in accordance with an embodiment of the disclosure.
Figure 3:
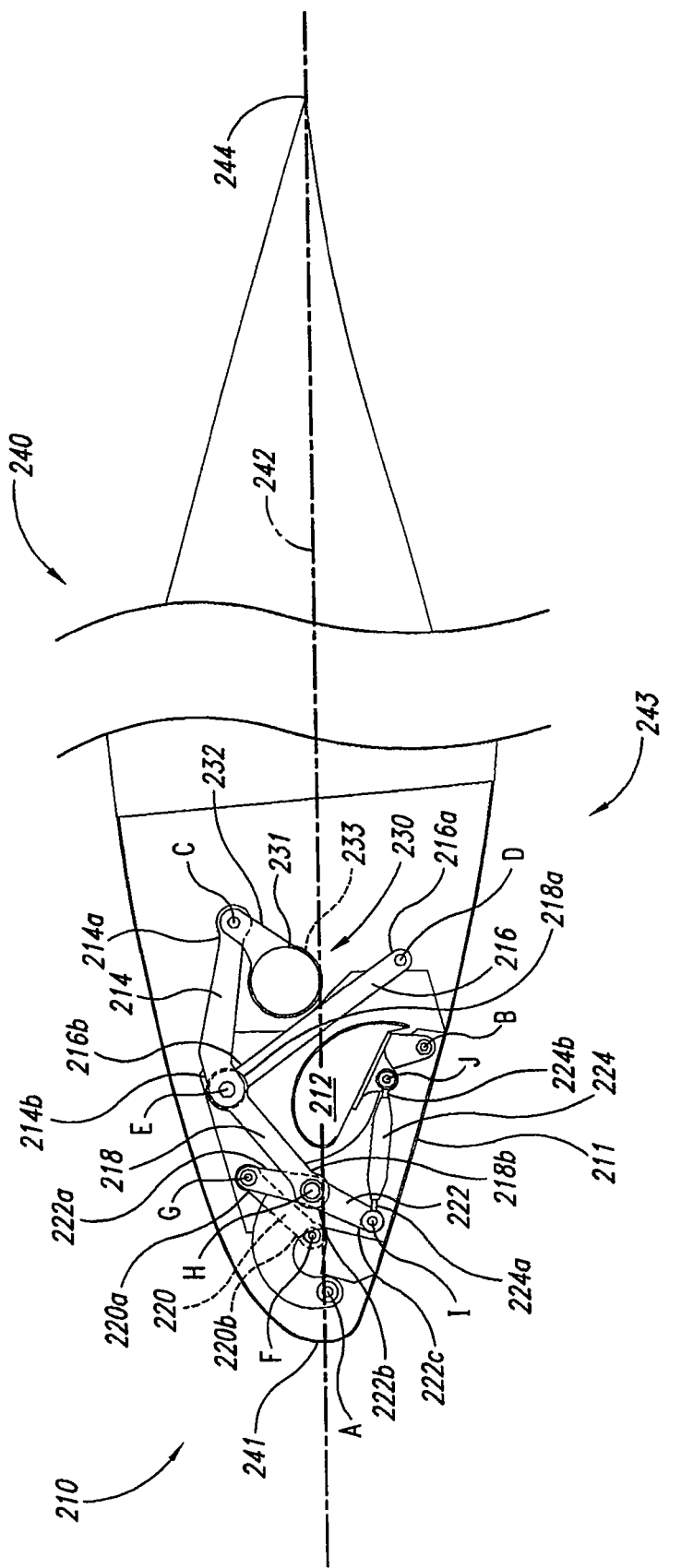
FIG. 3 is a partial schematic illustration of the airfoil and leading edge device shown in FIG. 2 with the leading edge device shown in a retracted position.

FIG. 2 is a partially schematic illustration of an airfoil 240 and a leading edge device 210 (e.g., a Krueger flap), shown in an extended position in accordance with an embodiment of the disclosure. FIG. 3 is a partially schematic illustration of the airfoil 240 and the leading edge device 210 shown in FIG. 2 with the leading edge device 210 in the retracted position. Referring to both FIGS. 2 and 3, the airfoil 240 includes a leading edge 241, a trailing edge 244, a lower surface 243, and a chord line 242 that extends through a mid-point of the leading edge 241 and a mid-point of the trailing edges 244.

An actuator driver 230 can be coupled to the airfoil 240 to move the leading edge device 210 between at least the retracted and extended positions. The actuator driver 230 can include one or more actuators 233, a torque tube 231, and a lever 232. The actuators 233 can be mechanically, hydraulically, pneumatically, and/or electrically operated. The actuator driver 230 can include other arrangements, for example, multiple levers 232 and links, and/or a direct connection between the actuators 233 and the leading edge device 210 without any levers 232 and/or torque tubes 231.

The leading edge device 210 includes a first flow surface 211 and a second flow surface 212. The first and second flow surfaces 211, 212 can include rigid and/or flexible portions (e.g., the first flow surface 211 can include a flexible panel and the second flow surface can include a solid portion and/or a flexible portion). As shown in FIG. 2, the first and second flow surfaces 211, 212 are positioned generally below the airfoil 240 to form an extension of the leading edge 241 when in the extended position. When in the retracted position (shown in FIG. 3) the first and second flow surfaces 211, 212 are positioned generally behind the leading edge 241 of the airfoil 240 to form a portion of the lower surface 243. In FIG. 3, the first flow surface 211 forms a lower portion of the airfoil 240 and the second flow surface 212 is positioned above and/or behind the first flow surface 211 and recessed into the airfoil 240. In other embodiments, other portions of the first flow surface 211 and/or the second flow surface 212 can form a part of the lower surface 243 of the airfoil 240. For example, in one embodiment a portion of the second flow surface 212 can also form a part of the lower surface 243 of the airfoil 240.

The first flow surface 211 can be coupled to the airfoil 240 at point A and the second flow surface 212 can be coupled to the first flow surface 211 at point B. Several links (e.g., six) can also couple the leading edge device 210 to the airfoil 240 and to the actuator driver 230. The arrangement of six links (shown as a first link 214, second link 216, third link 218, fourth link 220, fifth link 221 and sixth link 274) is described below with reference to FIGS. 2 and 3.

The first link 214 includes a first portion 214a (pivotally coupled to a lever 232 at point C) and a second portion 214b. A second link 216 includes a first portion 216a (pivotally coupled to the airfoil 240 at point D) and a second portion 216b. The leading edge device 210 can include a third link 218 having a first portion 218a and a second portion 218b. The second portion 214b of the first link 214 can be pivotally coupled to the second portion 216b of the second link 216 and the first portion 218a of the third link 218 at a first common point E.

The leading edge device 210 can include a fourth link 220 having a first portion 220a pivotally coupled to the airfoil 240 at point F and a second portion 220b. The leading edge device 210 can include a fifth link 222 having a first portion 222a, a second portion 222b, and a third portion 222c. The first portion 222a of the fifth link 222 can be pivotally coupled to the second portion 220b of the fourth link 220 at point G. Both the second portion 222b of the fifth link 222 and the second portion 218b of the third link 218 can be coupled to the first flow surface 211 at a second common point H.

The leading edge device 210 includes a sixth link 224 having a first portion 224a pivotally coupled to the third portion 222c of the fifth link 222 at point I and a second portion 224b. The second portion 224b of the sixth link 224 can be pivotally coupled to the second flow surface 212 at point J.

As illustrated in FIG. 2, the actuator driver 230 can move the first flow surface 211 by moving the first link 214, which in turn moves the second link 216, the third link 218, and the first flow surface 211. The actuator driver 230 also moves the second flow surface 212 through the various links described above. Movement of the second flow surface 212 relative to the first flow surface 211 is controlled primarily by the fourth link 220, the fifth link 222, and the sixth link 224.

The actuator driver 230, which drives the leading edge device 210, can also be coupled to other flight control devices (e.g., other leading edge devices and/or trailing edge devices) that have multiple extended positions. For example, the actuator driver 230 also can drive a set of leading edge slats that have an extended takeoff position and an extended landing position. Because in certain embodiments the leading edge device 210, shown in FIGS. 2 and 3, has a single extended position that is used for both takeoff and landing, there is a need to retain the first and second flow surfaces 211, 212 of the leading edge device 210 in at least approximately the single extended position, while the actuator driver 230 continues to move (rotate) to position the leading edge slats to another extended position (e.g., from the extended takeoff position to the extended landing position). Such a feature is illustrated in FIG. 2.

In FIG. 2, the first and second flow surfaces 211, 212 of the leading edge device 210 are shown in the extended position and the actuator driver 230 is shown in a first position by solid lines and in a second position by phantom lines. As the actuator driver 230 moves from the first position to the second position, the torque tube 231 rotates and moves the lever 232, which in turn moves the first link 214. Although the first link 214 moves when the actuator driver 230 moves from the first position to the second position, the first and second flow surfaces 211, 212 remain located in, and/or return to, at least approximately the same position.

In other embodiments one or both of the common points E and H described above can be replaced by multiple pivot points. For example, in one embodiment, the second portion 214b of the first link 214 can be pivotably coupled to the second portion 216b of the second link 216 at a different point than the point where the first portion 218a of the third link 218 is coupled to the second portion 216b of the second link 216. In another embodiment, the second portion 218b of the third link 218 can be coupled to the first flow surface 211 at a different point than the point where the second portion 222b of the fifth link 222 is coupled to the first flow surface 211. In yet another embodiment, the second portion 218b of the third link 218 can be coupled to the fifth link 222 at a different point than the point where the fifth link 222 is coupled to the first flow surface 211.

Figure 1:
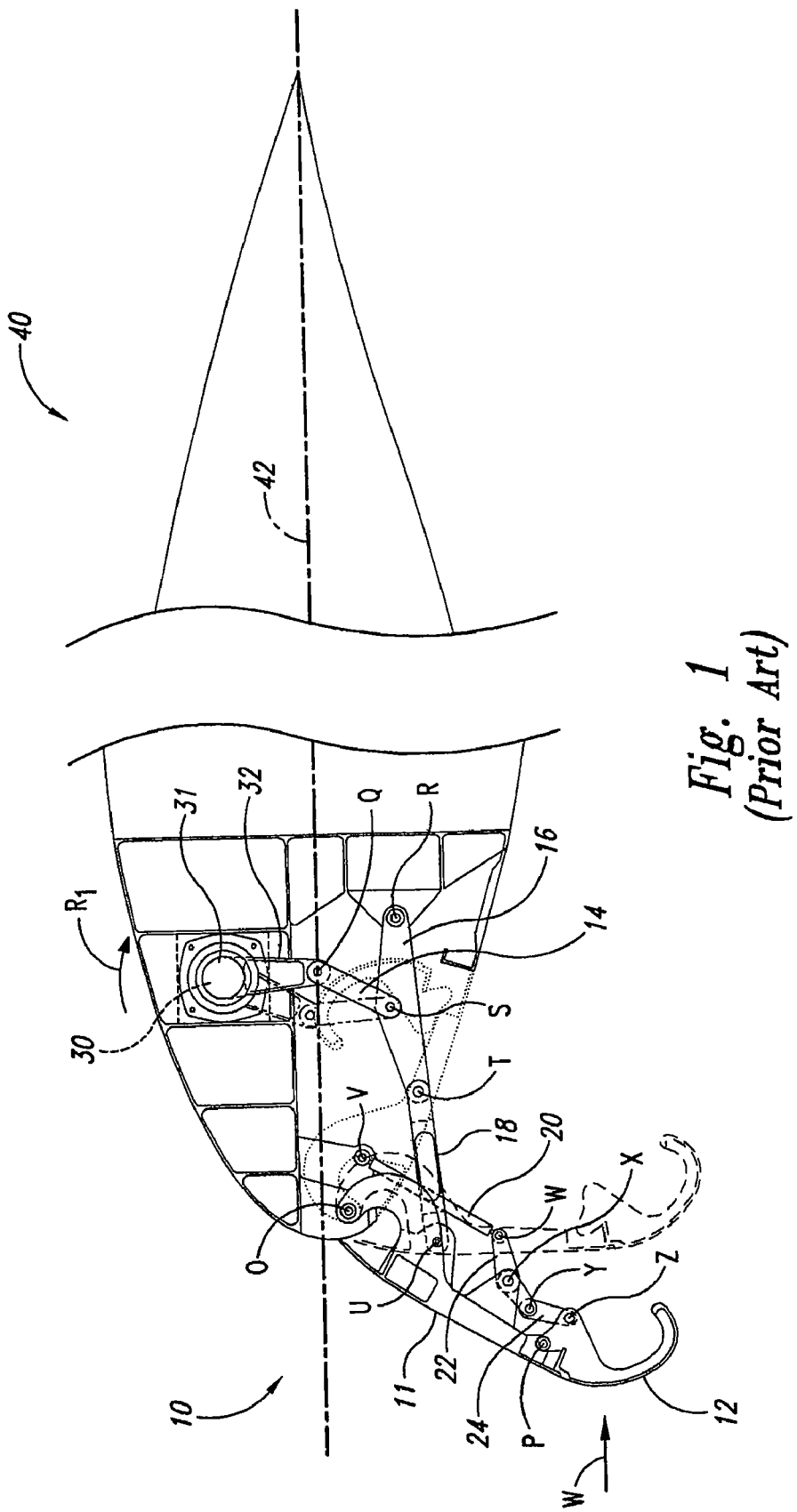
FIG. 1 is a partial schematic illustration of an airfoil with a Krueger assembly in accordance with the prior art.

A feature of embodiments described above with reference to FIGS. 2 and 3 is that fewer pivot points are needed to position the first and second flow surfaces between the retracted and extended positions than are required by current systems. In particular, the links in the system described above with reference to FIG. 1 require ten pivot points, while the system described above with reference to FIGS. 2 and 3 requires only eight or nine pivot points. An advantage of this feature is that reducing the number of pivot points can reduce the cost of manufacturing and/or maintaining the leading edge device. Another advantage of this feature is that having fewer pivot points can reduce the weight of the leading edge device, which can reduce the operating cost of the aircraft.

Figure 4:
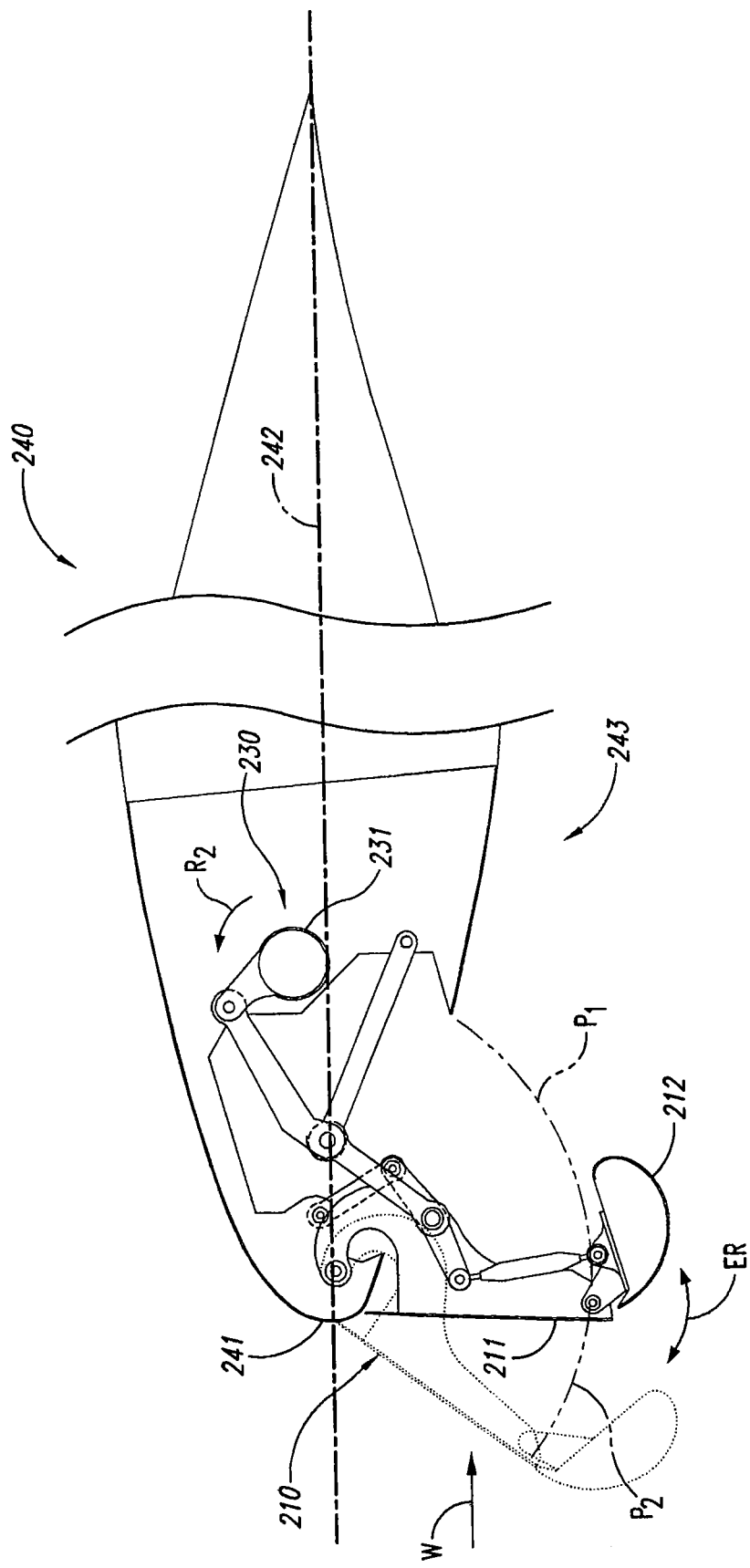
FIG. 4 is a partial schematic illustration of an airfoil and a leading edge device in accordance with another embodiment of the disclosure.

FIG. 4 is a partially schematic illustration of an airfoil 240 and a leading edge device 210, similar to the leading edge device discussed above with reference to FIGS. 2 and 3, but configured to provide an additional mechanical advantage and/or reduce drag during deployment or extension, in accordance with another embodiment of the disclosure.

In the illustrated embodiments, the actuator driver 230 rotates in the direction of arrow $R_2$, to move the first and second flow surfaces 211, 212 from a retracted position to an extended position. As the actuator driver 230 rotates the torque tube 231 in the direction of arrow $R_2$, the top portion of the torque tube 231 (e.g., the portion of the torque tube 231 facing away from the lower surface 243 of the airfoil 240) moves towards the leading edge 241 of the airfoil 240. Correspondingly, the bottom portion of the torque tube 231 (e.g., the portion of the torque tube 231 facing toward the lower surface 243 of the airfoil 240) moves away from the leading edge 241 of the airfoil 240. Because the actuator driver 230 rotates the torque tube 231 in this manner, in some embodiments (depending on the specific components used in the leading edge device 210 (e.g., the size of the first and second flow surfaces 211, 212)), pivot points can be placed to provide an additional mechanical advantage to extend the first and second surfaces 211, 212 against the relative wind (depicted as arrow W) as compared to when the actuator driver 230 rotates the torque tube 231 in the opposite direction (as is done with current systems). This can reduce the force required to extend the leading edge device 210. In other embodiments, the leading edge device 210 can have different components and the pivot points can be located to provide a mechanical advantage when the actuator driver 230 rotates the torque tube 231 in a direction opposite arrow $R_2$.

Additionally, as shown in FIG. 4, the leading edge device 210 can be configured to reduce drag during deployment by "hiding" or at least partially hiding the second flow surface 212 from the relative wind (arrow W) during retraction and/or extension of the leading edge. As the leading edge device 210 moves between retracted and extended positions, the first and second flow surfaces 211, 212 move along a motion path, shown as arrow ER in FIG. 4. In the illustrated embodiment, the motion path ER includes the motion of an end of the first flow surface 211. In other embodiments, the motion path ER can be defined by the motion of other portions of the leading edge device 210. In any of these embodiments, the second flow surface 212 can be located behind and/or above the first flow surface 211 as the first flow surface 211 transitions through the high drag "barn door" position (e.g., where the first flow surface is at least approximately perpendicular to the chord line 242 of the airfoil 240). Accordingly, the second flow surface 212 can be positioned to contribute less drag than a conventional second flow surface (which typically compounds the drag created by the first flow surface by being unhidden during at least a portion of motion of the first flow surface, during extension and retraction.

The motion path ER can include a first segment $P_1$ and a second segment $P_2$. The first segment $P_1$ can extend between the retracted position and an intermediate position where the first flow surface 211 is at least approximately perpendicular to the chord line 242 of the airfoil 240 (shown in solid lines). The second segment $P_2$ can extend between the intermediate position and the extended position (shown in dotted lines). The leading edge device 210 can be configured so that the second flow surface 212 remains generally above and/or behind the first flow surface 211 (and generally out of the relative wind) when the first and second flow surfaces 211, 212 are in the first segment $P_1$ of the motion path ER, reducing the force on the first and second flow surfaces 211, 212, and therefore reducing the drag created by the first and second flow surfaces 211, 212. The leading edge device 210 can also be configured to position the second flow surface 212 below the first flow surface 211 to form an extension of the first flow surface as the leading edge device 210 moves through at least a portion of the second segment of the motion path (e.g., when the leading edge device 210 reaches the extended position). This feature allows the first and second flow surfaces, 212 to move between the retracted and extended positions, while reducing the force on the flow surfaces transiting the barn door position when compared to current systems.

In certain embodiments, the first and second flow surfaces 211, 212 can be discontinuous while in the first segment $P_1$ of the motion path ER (as shown in FIG. 4). In other embodiments, the first and second flow surface 211, 212 can be discontinuous while in the first and second segments $P_1$, $P_2$. In still other embodiments, the first and second flow surfaces 211, 212 can include a flexible material and be continuous throughout the first and second segments $P_1$, $P_2$ of the motion path ER.

Although in the illustrated embodiment, the linkage of the leading edge device 210 is configured to both (1) gain a mechanical advantage through the placement of the pivot points and (2) reduce the force on the first and second flow surfaces 211, 212 during deployment, it should be understood that the leading edge device 210 can be configured to have either of these features independently in other embodiments. For example, in another embodiment, a separate (second) actuator can be coupled between the first and second flow surfaces 211, 212 to extend the second flow surface 212 from generally above and/or behind the first flow surface 211 only after the first flow surface 211 has been placed in its extended position. Correspondingly, during retraction, the second actuator can retract the second flow surface 212 behind the first flow surface 211, before the first flow surface 211 is moved towards the retracted position.

A feature of at least some embodiments described above is that the amount of force that the actuator driver must exert to extend the first and second flow surfaces is reduced over current systems. An advantage of this feature is that smaller actuators can be used to extend and retract the leading edge device. This can result in a reduction in manufacturing costs, a reduction in weight, and a reduction in operating costs. Another advantage of this feature is that the wear and tear on the actuator driver and the leading edge device can be reduced. This can also result in a reduction in operating expenses. Still another advantage of this feature is that the leading edge device can use a larger second flow surface that can be better tailored to provide certain performance characteristics (when compared with existing systems) without a corresponding increase in the force that the actuator driver must exert during extension.

Another feature of at least some embodiments is that the leading edge device can create less drag during retraction. This in turn creates less overall aircraft drag during retraction. An advantage of this feature is that takeoff and initial climb out performance can be increased, thereby increasing maximum takeoff gross weight.

Figure 5:
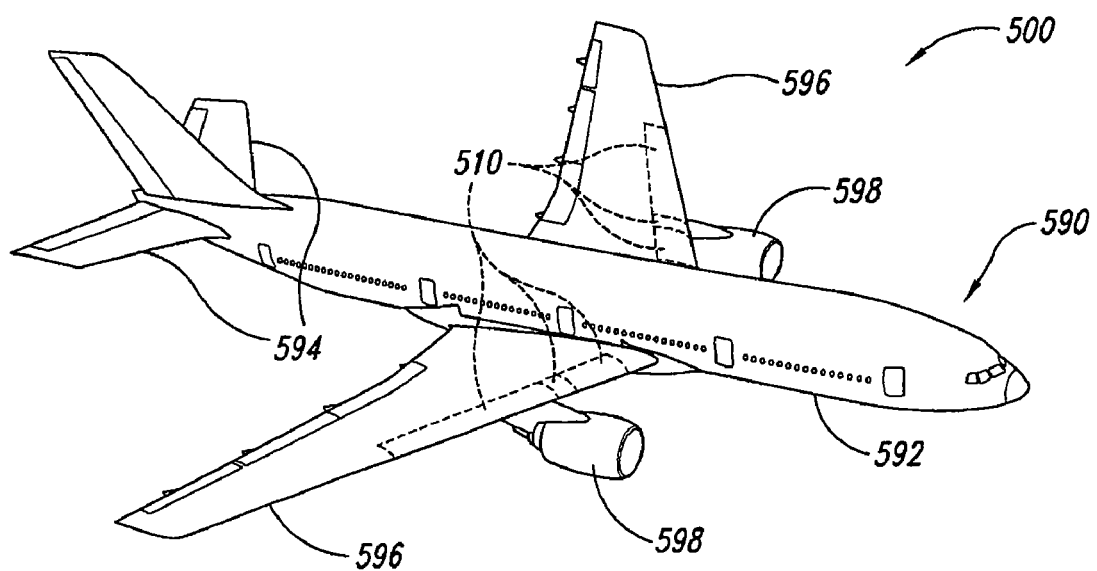
FIG. 5 is a partial schematic illustration of an aircraft with multiple airfoils and multiple leading edge devices in accordance with yet another embodiment of the disclosure.

Embodiments of the disclosure described above with reference to FIGS. 2-4 can be installed on many types of airfoils. For example, FIG. 5 illustrates an aircraft system 500, including an aircraft 590 with a fuselage 592, wings 596, and multiple leading edge devices 510 configured in accordance with embodiments of the present disclosure. In FIG. 5, the leading edge devices 510 are coupled to the wings 596 of the aircraft 590. In other embodiments, leading edge devices similar to those described above can be installed on other airfoils (e.g., on a horizontal tail 594). In FIG. 5, leading edge devices 510 are used on portions of the airfoil outboard and inboard of the aircraft engines 598. Smaller segments can be used proximate to the aircraft engines 598 to control airflow around the engines 598 and local airfoil section (two smaller segments are shown inboard of the engines in FIG. 5). These smaller leading edge devices 510 can be used to control the airflow proximate to the engines 598 and airfoil and can reduce drag and/or improve aircraft performance characteristics over an aircraft 590 without such devices. In other embodiments, portions of larger segments can be used in the same manner, for example, a single inboard segment can be used on each wing 596 and a portion of the single inboard segment can be used to control airflow proximate to the engines 598.

Figure 6:
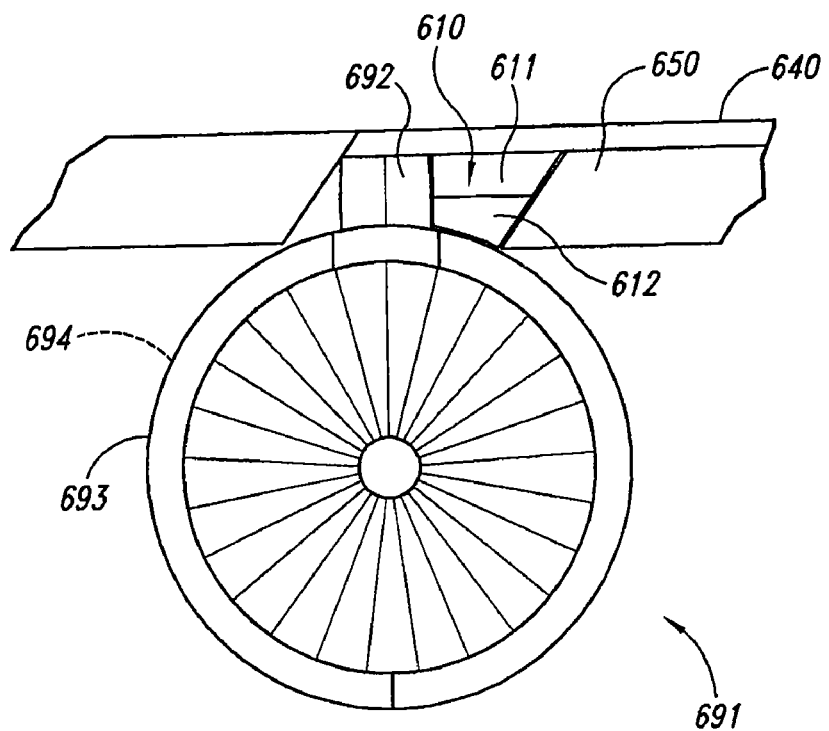
FIG. 6 is a partial schematic illustration of a leading edge device at least approximately aerodynamically sealed against a pylon, an engine nacelle, and another leading edge device, in accordance with still another embodiment of the disclosure.
Figure 7:
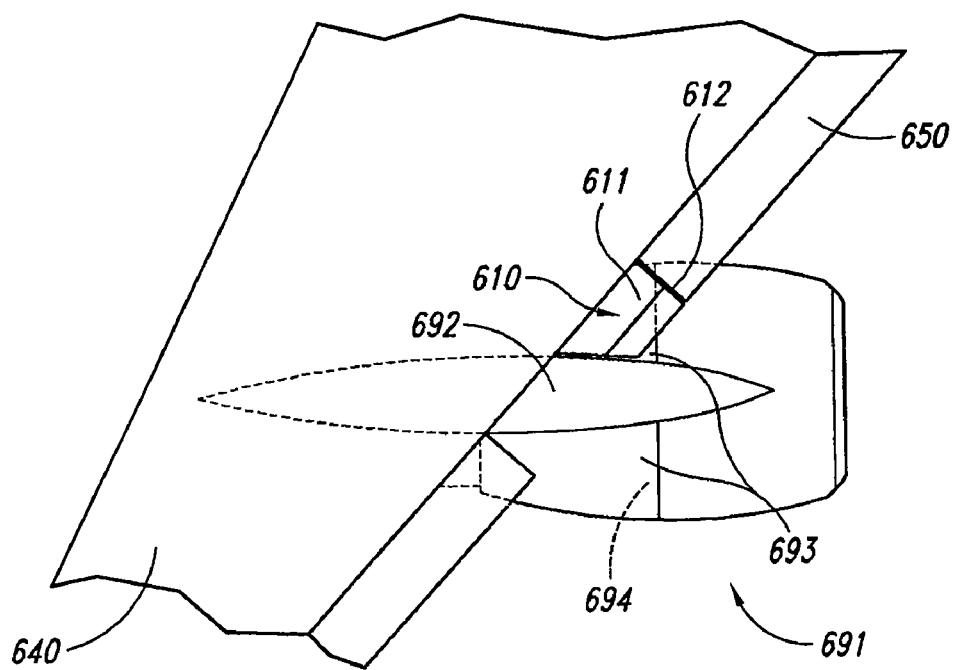
FIG. 7 is a partial schematic platform illustration of the leading edge device arrangement shown in FIG. 6.

FIGS. 6 and 7 show a first leading edge device 610 with a first flow surface 611 and second flow surface 612 coupled to an airfoil 640 proximate to an engine 691. In FIGS. 6 and 7, the first leading edge device 610 is shown in an extended position such that it is at least approximately aerodynamically sealed against an engine pylon 692, an engine nacelle 693, and a second leading edge device 650, which is laterally disposed from the first leading edge device 610 to prevent a substantial amount of air from flowing through the sealed area. In other embodiments, the first leading edge device 610 can be at least approximately aerodynamically sealed against one or more of the engine pylon 692, the engine nacelle 693, and/or the second leading edge device 650.

In certain embodiments, the leading edge device 610 can seal against an engine nacelle that is coupled to a thrust reverser 694 so that part of the engine nacelle moves with the deployment of the thrust reverser. A portion of the leading edge device (e.g., the second flow surface 612) can move with the nacelle to maintain an approximate aerodynamic seal and/or to retain a selected gap or distance between the nacelle 693 and the second flow surface 612 of the leading edge device 610 as part of the nacelle moves with the thrust reverser. In certain embodiments, the second flow surface 612 can include a flexible portion to further facilitate at least approximately aerodynamically sealing the second flow surface 612 against other surfaces.

A feature of embodiments described above is that the flow proximate to an airfoil (e.g., a wing) and an engine can be controlled to reduce aerodynamic drag or increase aircraft performance (e.g., lift and/or high angle of attack performance). An advantage of this feature is that overall aircraft performance (e.g., lift and/or drag) can be increased. This performance increase can improve landing and/or takeoff performance allowing an aircraft to carry more weight into or out of selected airports.

From the foregoing, it will be appreciated that specific embodiments of the disclosure have been described herein for purposes of illustration, but that various modifications may be made without deviating from the spirit and scope of the disclosure. For example, aspects of the disclosure described in the context of particular embodiments may be combined or eliminated in other embodiments. Although advantages associated with certain embodiments of the disclosure have been described in the context of those embodiments, other embodiments may also exhibit such advantages. Additionally, none of the foregoing embodiments need necessarily exhibit such advantages to fall within the scope of the disclosure. Accordingly, the disclosure is not limited except as by the appended claims.

What is claimed is:

1. A method of reducing drag of a leading edge device having first and second flow surfaces, comprising the steps of:
    coupling the first flow surface to an airfoil having a chord line;
    coupling the second flow surface to the first flow surface;
    moving the leading edge device to an intermediate position between a retracted position and an extended positions;
    orienting the first flow surface generally perpendicular to the chord line when the leading edge device is in the intermediate position; and
    maintaining the second flow surface generally behind the first flow surface when moving the leading edge device between the retracted position and the intermediate position.

2. The method of claim 1 further comprising the step of:
extending the second flow surface below the first flow surface when moving the leading edge device from the intermediate position to the extended position.

3. The method of claim 1 further comprising the step of:
extending the second flow surface below the first flow surface after moving the leading edge device to the extended position.

4. The method of claim 3 further comprising the step of:
moving the second flow surface behind the first flow surface before moving the leading edge device from the extended position to the retracted position.

5. The method of claim 1 further comprising the step of:
positioning the second flow surface generally above the first flow surface when the leading edge device is in the retracted position.

6. The method of claim 5 further comprising the step of:
recessing the second flow surface within the airfoil when the leading edge device is in the retracted position.

7. The method of claim 5 wherein the airfoil has a lower surface, the method further comprising the step of:
using the first flow surface to form a portion of the lower surface when the leading edge device is in the retracted position.

8. The method of claim 1 wherein the aircraft includes an actuator and other flight control devices, the method further comprising the steps of:
driving the leading edge device into the extended position using the actuator; and
driving at least one of the other flight control devices using the actuator while maintaining the leading edge device in the extended position.

9. The method of claim 1 wherein the airfoil comprises a wing of an aircraft.

10. The method of claim 9 wherein the aircraft includes at least one of an engine nacelle and an engine pylon, the method further comprising the step of:
sealing at least a portion of the leading edge device against at least one of the engine nacelle and the engine pylon when the leading edge device is in the extended position.

11. A method of reducing drag of a leading edge device of a wing during movement of the leading edge device between retracted and extended positions along a motion path, comprising the steps of:
coupling an upper portion of a first flow surface to a leading edge of the wing having chord line;
coupling an upper portion of a second flow surface to a lower portion of the first flow surface;
moving the leading edge device along a first segment of the motion path between the retracted position and an intermediate position;
orienting the first flow surface generally perpendicular to the chord line when the leading edge device is in the intermediate position; and
maintaining the second flow surface generally behind the first flow surface when moving the moving the leading edge device along the first segment.

12. The method of claim 11 further comprising the step of:
extending the second flow surface behind the first flow surface before moving the leading edge device from the extended position to the retracted position.

13. The method of claim 11 further comprising the step of:
moving the leading edge device along a second segment of the motion path between the intermediate position and the retracted position; and
extending the second flow surface below the first flow surface when moving the leading edge device along the second segment.

14. The method of claim 11 further comprising the step of:
positioning the second flow surface generally above the first flow surface when the leading edge device is in the retracted position.

15. The method of claim 14 further comprising the step of:
recessing the second flow surface within the wing when the leading edge device is in the retracted position.

16. The method of claim 15 wherein the wing has a lower surface, the method further comprising the step of:
using the first flow surface to form a portion of the lower surface when the leading edge device is in the retracted position.

17. A method of reducing drag of a leading edge device of an aircraft wing during movement of the leading edge device between retracted and extended positions along a motion path, comprising the steps of:
coupling an upper portion of a first flow surface to the leading edge of the wing;
coupling an upper portion of a second flow surface to a lower portion of the first flow surface;
moving the leading edge device along a first segment of the motion path between the retracted position and an intermediate position;
maintaining the second flow surface generally behind the first flow surface with respect to relative wind when moving the moving the leading edge device along the first segment;
orienting the first flow surface approximately perpendicular to a chord line of the wing when the leading edge device is in the intermediate position;
moving the leading edge device along a second segment of the motion path between the intermediate position and the retracted position; and
extending the second flow surface below the first flow surface when moving the leading edge device along the second segment.

* * * * *

Disclaimer

7,992,826 B2 — James M. Wheaton, Collierville, TN (US); Stephen R. Amorosi, Seattle, WA (US). LEADING EDGE FLAP METHOD. Patent dated August 9, 2011, Disclaimer filed March 21, 2011, by the Assignee, The Boeing Company.

The term of this patent shall not extend beyond the expiration date of Pat. No. 7,828,250.

*(Official Gazette September 6, 2011)*